(12) United States Patent  
Buchanan et al.

(10) Patent No.: US 7,726,446 B1
(45) Date of Patent: Jun. 1, 2010

(54) MOBILE HUNTING BLIND (76) Inventors: Vernon Roger Buchanan, 47901 E.41st Rd., Pawnee, OK (US) 74058; Francelia Lynn Buchanan, 47901 E.41st Rd., Pawnee, OK (US) 74058

( * ) Notice: Subject to any disclaimer, the term of this patent is extended or adjusted under 35 U.S.C. 154(b) by 757 days.

(21) Appl. No.: 11/307,243

(22) Filed: Jan. 27, 2006

Related U.S. Application Data (60) Provisional application No. 60/648,180, filed on Jan. 28, 2005.

(51) Int. Cl.
*E06C 5/00* (2006.01)
(52) U.S. Cl. ................... 182/127; 182/63.1
(58) Field of Classification Search ........... 182/63.1, 182/127
See application file for complete search history.

(56) References Cited

U.S. PATENT DOCUMENTS

| | | | |
|---|---|---|---|
| 4,696,374 A | 9/1987 | Hale | |
| 5,220,116 A * | 6/1993 | Sheets | 42/94 |
| 5,295,555 A * | 3/1994 | Strange | 182/2.5 |
| 5,297,844 A * | 3/1994 | Haustein | 296/190.04 |
| 5,466,111 A * | 11/1995 | Meyer | 414/462 |
| 5,584,356 A * | 12/1996 | Goodrich | 182/63.1 |
| 5,595,265 A | 1/1997 | Lebrocquy | |
| 5,832,555 A * | 11/1998 | Saucier et al. | 14/71.1 |
| 5,842,532 A * | 12/1998 | Fox et al. | 180/6.48 |
| 6,068,277 A * | 5/2000 | Magnussen | 280/166 |
| 6,105,721 A * | 8/2000 | Haynes | 182/127 |
| 6,161,860 A * | 12/2000 | Corneau | 280/642 |
| 6,238,169 B1 * | 5/2001 | Dupuy et al. | 414/546 |
| 6,250,483 B1 * | 6/2001 | Frommer | 212/180 |
| 6,264,227 B1 * | 7/2001 | Johnson et al. | 280/400 |
| 6,293,560 B1 * | 9/2001 | Byatt | 280/5.2 |
| 6,334,269 B1 * | 1/2002 | Dilks | 37/235 |
| 6,416,272 B1 * | 7/2002 | Suehiro et al. | 414/546 |
| 6,435,804 B1 * | 8/2002 | Hutchins | 414/540 |
| 6,439,635 B1 | 8/2002 | Hardy et al. | |
| 6,578,854 B2 * | 6/2003 | Wucherpfennig et al. | 180/330 |
| 6,837,670 B2 * | 1/2005 | Goodrich | 414/546 |
| 6,969,049 B2 * | 11/2005 | Bilcik | 254/278 |
| 6,971,834 B2 * | 12/2005 | Morris | 414/539 |
| 7,040,248 B1 * | 5/2006 | Whitfield | 114/364 |
| 7,194,842 B2 * | 3/2007 | Baird | 52/125.2 |
| 7,195,106 B2 * | 3/2007 | Heynssens | 187/244 |
| 7,354,050 B2 * | 4/2008 | Brockway | 280/66 |
| 7,374,390 B2 * | 5/2008 | Strong | 414/546 |
| 2002/0057960 A1 * | 5/2002 | Cohn et al. | 414/546 |
| 2002/0175007 A1 * | 11/2002 | Strong | 180/54.1 |
| 2003/0019684 A1 | 1/2003 | Wucherpfennig et al. | |
| 2003/0150663 A1 * | 8/2003 | Farbotnik et al. | 180/312 |
| 2003/0178251 A1 * | 9/2003 | Hewitt | 182/63.1 |
| 2004/0145134 A1 * | 7/2004 | Bares | 280/32.7 |
| 2006/0086569 A1 * | 4/2006 | Brown | 182/63.1 |
| 2006/0108156 A1 * | 5/2006 | Heinzmann et al. | 180/8.2 |
| 2007/0183881 A1 * | 8/2007 | O'Leary et al. | 414/546 |
| 2007/0200307 A1 * | 8/2007 | Bares | 280/32.7 |

(Continued)

*Primary Examiner*—Katherine W Mitchell
*Assistant Examiner*—Candace L. Bradford
(74) *Attorney, Agent, or Firm*—Head, Johnson & Kachigian, P.C.

(57) ABSTRACT

A mobile hunting blind includes a platform that may be raised and lowered to accommodate handicapped persons in a vehicle for transportation of the hunting blind and the person. The platform has a hunting blind wrapped around it and has a turntable that allows a person to spin within the hunting blind.

17 Claims, 5 Drawing Sheets

U.S. PATENT DOCUMENTS

2008/0290618 A1* 11/2008 Yanaka et al. .............. 280/6.15
2008/0308358 A1* 12/2008 Zuercher ................... 187/200
2009/0129906 A1* 5/2009 Fisher et al. ................ 414/546
2009/0155037 A1* 6/2009 Sahr et al. .................. 414/544

* cited by examiner

MOBILE HUNTING BLIND

REFERENCE TO PENDING APPLICATIONS

This application claims the benefit of U.S. Provisional Application Ser. No. 60/648,180, filed on Jan. 28, 2005.

BACKGROUND OF THE INVENTION

1. Field of the Invention

The present invention relates to a mobile hunting blind. Specifically, the present invention relates to a combination mobile hunting blind and a motorized vehicle with a rotatable platform that may be raised and lifted and driven off road.

2. Prior Art

Hunting has long been a sport and tradition all across the world. Most hunting is done in fields, forests or other remote locations. To reach a suitable spot for hunting various prey, one must travel significant distances off road. To accomplish this, hunters have long utilized all terrain vehicles (ATV's) to travel to a desired hunting spot. Such spots are typically not accessible by wheelchairs or automobiles. The result is that it is extremely difficult if not impossible for wheelchair bound and other handicapped persons to hunt.

It is therefore desirable to provide a means for transporting wheelchair bound and other handicapped persons to remote, off road locations.

It is also desirable to provide a mobile hunting blind that is easily moved and used by handicapped or other persons.

SUMMARY OF THE INVENTION

The present invention provides a means for handicapped persons to easily transport themselves to a remote location for hunting or other tasks. The invention is wheelchair accessible. The invention comprises a base or platform large enough to hold a wheelchair that is raised and lowered between two sets of wheels or tracks. The side door is lowered as a ramp. Once a person in a wheelchair rolls onto the platform, it is lifted and the device is powered by a hydraulic or other motor. The device is capable of driving anywhere a typical ATV can go.

Preferably, the platform of the invention includes a turntable that allows a person in a wheelchair sitting on the platform to rotate 360°. Optionally, the device can be covered in camouflage material. A roof may also be placed on it such that it forms a hunting blind. The device also includes a rear deck that allows a person to place prey or other items on for transport. Optionally, the rear deck can include a lift arm mechanism to assist a person situated in a wheel chair in lifting their prey or other items from the ground to the rear deck.

The present invention provides an all terrain vehicle that is wheelchair accessible. A small platform comprising a hunting blind is attached to two wheel axles or two tracks, a motor and a steering means. Preferably, the device is made from metal, such as aluminum. However, those skilled in the art will appreciate that the frame and body of the invention may be comprised of any material suitably strong. It is preferred to use a material as light as possible.

DETAILED DESCRIPTION OF THE PREFERRED EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification, but is limited only by the scope of the attached claim or claims, including the full range of equivalency to which each element thereof is entitled.

The present invention comprises a frame attached to two sets of wheels or tracks. The wheels or tracks may pivot upward and downward so that the frame either lays upon the ground or is elevated above it and supported by the sets of wheels or tracks. The invention includes a steering mechanism to allow a person sitting on the base to control the direction of movement of the device. The invention also comprises a motor attached to at least one set of wheels or both tracks. It provides a forward and backward motion for the invention. The motor may be of any type known in the art. Preferably, a hydraulic motor is used to facilitate easy operation of the device. Control means allow an operator of the device to control the direction and speed of the movement.

Figure 1:
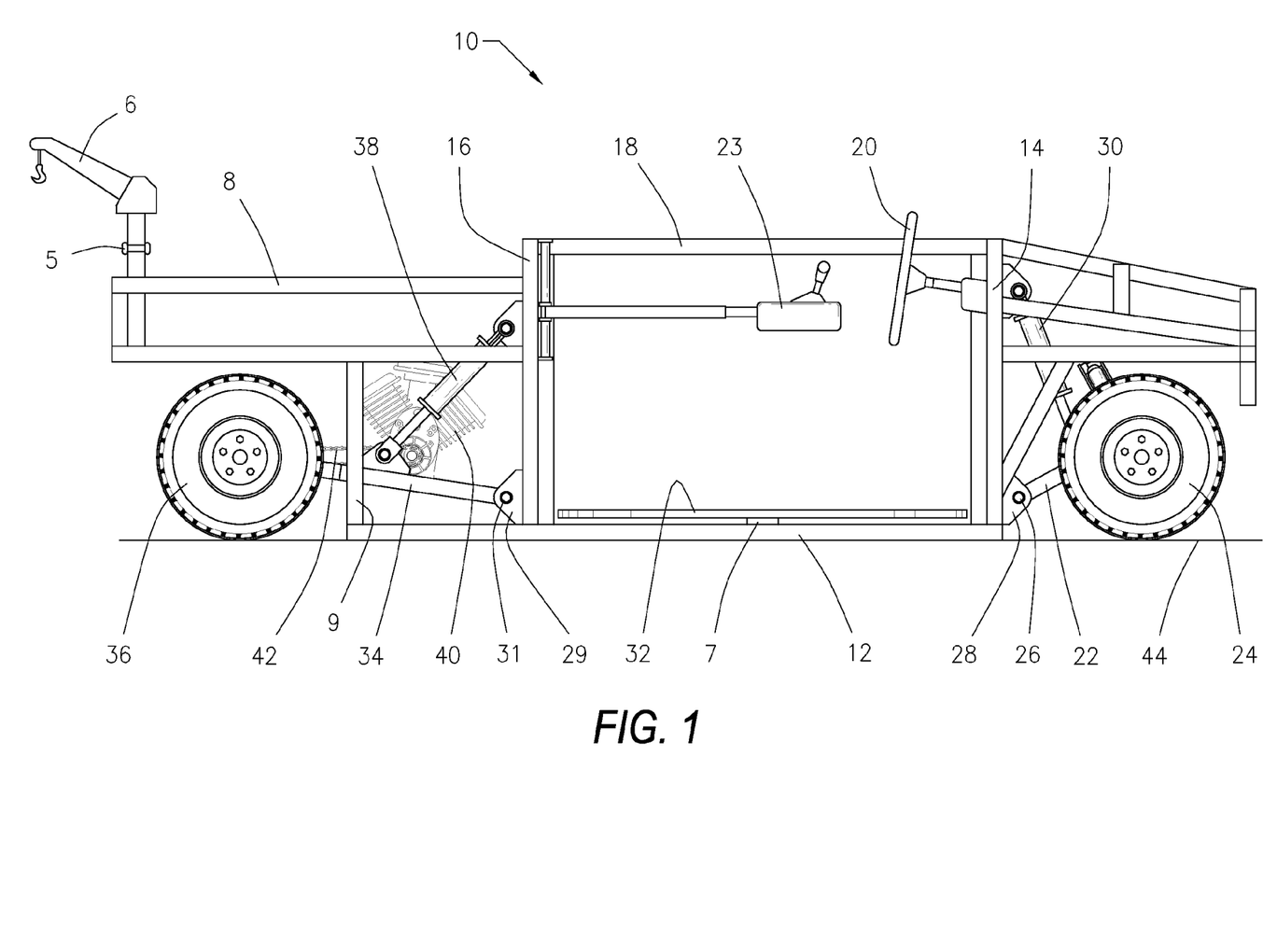
FIG. 1 is a side diagrammatic view of the invention in the stationary position.

FIG. 1 shows a side diagrammatic view of a preferred embodiment of the invention. In FIG. 1, the base 12 is flush with the ground 44. Attached to the base is a frame comprised of a rear plate 16, a front plate 14 and a left panel 18. Not shown is a door on the right side of the invention. Those skilled in the art may appreciate that the door may be attached to base 12 with hinges that would allow the door to be pivoted in a downward direction to open the body of the frame. In the open position, the door would act as a ramp to allow persons situated in a wheelchair access to the frame. The door 64 could be mechanically opened and closed with a hydraulic cylinder or other mechanism.

Those skilled in the art will also appreciate that the open door could also be used parallel to the base with a lift mechanism to allow access to the vehicle. The door would go from a position flush and parallel with the ground to a position parallel with the base allowing even access to the vehicle. The door could be powered or moved by hydraulic or pneumatic electric motor or other drive mechanism. Attached to the base via a rotatable pivot 7 is turntable 32.

Attached to the front plate 14 is a steering wheel 20 extending from a steering column. The steering wheel may be retracted during loading and unloading and extended during vehicle operation. On the front of the frame is a front assembly comprising a mount plate 28 attached to pivot arm 22 by means of pivot pin 26. Piston 30 is attached to both front plate 14 and pivot arm 22. At the end of pivot arm 22 is front wheel 24. Front wheel 24 is rotatable perpendicular to pivot arm 22 and its own axis of rotation in order to allow the device to be turned left or right by actuating the steering wheel 20. In a preferred embodiment, there is both a left and a right front wheel, pivot arm, mount plate and pivot pin. However, those skilled in the art will appreciate that it may be possible to have only one front wheel. Two front wheels are preferred to increase stability.

On the rear of the frame is a rear assembly consisting of rear plate 16 is mounting plate 29 attached to pivot arm 34 by means of pivot pin 31. Pivot arm 34 is also attached to rear wheel 36. Piston 38 is attached both to rear plate 16 and pivot arm 34. Although not explicitly shown in this diagram, there is both a left and a right rear wheel. Both are attached to motor 40 by means of drive chain or belt 42. Motor 40 allows actuation of rear wheel 36 such that the device may be moved in both forward and backward directions. Actuation of the motor is controlled by means of control panel 23 such that an operator of the device may both steer the invention to the left or the right using the steering wheel and backward and forward using control panel 23. However, those skilled in the art may appreciate that the steering wheel and control panel may be replaced with a joystick control (not shown). A joystick would allow an operator of the invention to simultaneously steer in a left and right direction while controlling the backward and forward movement. Thus, the joystick would allow persons with minimal ability in dexterity movement to operate the invention. Turntable 32 is attached to base 12 by a rotatable pivot 7 that allows a person sitting in a wheelchair within the frame to easily rotate 360° with very little effort. This allows a person situated in a wheelchair in the invention to face any direction when desired. This is especially useful when a wheelchair bound person utilizes the invention for hunting, bird watching and other observational functions. Attached perpendicularly to the rear of rear plate 16 is rear deck frame 8. The rear deck frame 8 is supported by a support beam 9 that runs parallel to rear plate 16 and perpendicular to base 12. In addition, those skilled in the art may appreciate the addition of a crane lift arm 6 and winch mechanism 5 attached to the rear deck frame 8 to allow the operator of the invention to lift prey or other objects and set them on the rear deck 8 for transport.

Figure 2:
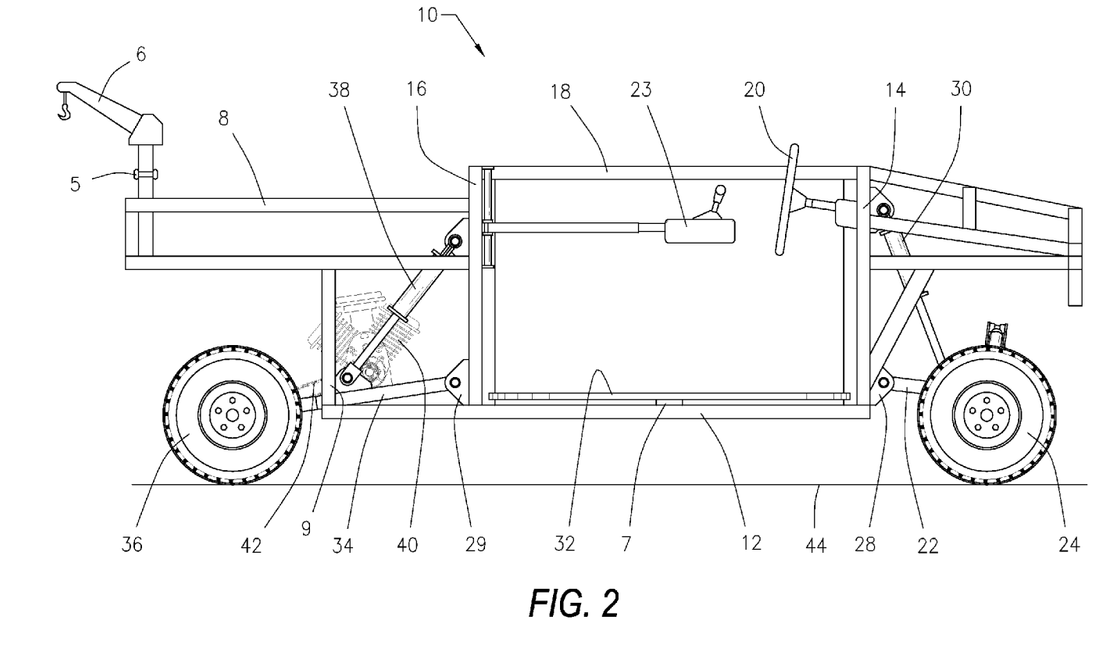
FIG. 2 is a side diagrammatic view of the invention in its mobile configuration.

FIG. 2 shows the device 10 of FIG. 1 in its mobile state. FIG. 1 illustrates the invention is a stationary immobile state ideal for loading and unloading a person in a wheelchair. FIG. 2 shows the invention pre-configured to allow transportation of a person in a wheelchair to off road locations. Those skilled in the art will appreciate that wheelchairs and many other devices designed to allow freedom of movement for handicapped persons are poorly suited for an off road environment. It is therefore difficult or impossible for handicapped persons to venture off the beaten path to ideal locations for hunting, fishing, bird and other animal observations. Various tasks associated with farming, camping and other recreation that takes place off of paved areas.

In FIG. 2, the base 12 is no longer flush with the ground 44. This is because pistons 30 and 38 have been extended such that pivot arms 22 and 34 are now parallel to base 12. Base 12 and the entire frame including back plate 16 and front plate 14 are substantially lifted above the ground. The entire device is now supported by front wheel 24 and rear wheel 36. The device now operates in the same fashion as an all terrain vehicle. Those skilled in the art will appreciate that the distance between the base 12 and the ground 44 depends upon the extent to which pivot arms 22 and 34 pivot, the size of the wheels 24 and 36, and the extent to which pistons 30 and 38 may be extended and retracted. When the device 10 is in the confirmation shown in FIG. 2, it is substantially more difficult for a handicapped person to load a wheelchair into the device and onto turntable 32. However, the configuration shown in FIG. 2 allows the device to easily traverse uneven, rocky, muddy or other terrain otherwise inhospitable to a typical wheelchair.

Figure 3:
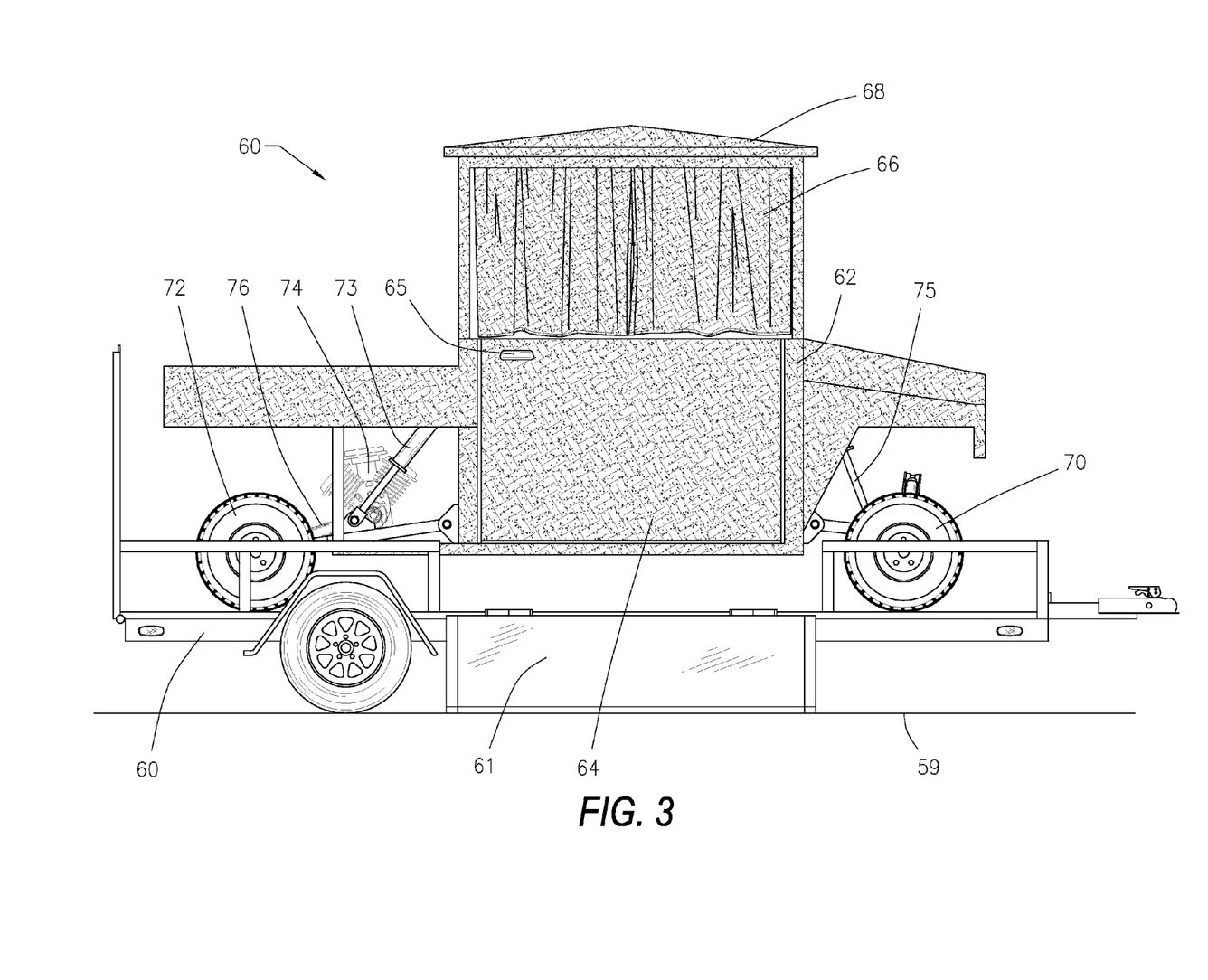
FIG. 3 is a side diagrammatic view of an alternative embodiment of the invention.

FIG. 3 shows an alternative embodiment of the present invention. The device 60 is still raised and lowered from the ground by means of pistons 75 and 73 raising and lowering the positions of the wheels 70 and 72 respectively. The main difference between this embodiment and that of FIGS. 1 and 2 is that this device is enclosed to form a mobile hunting blind. Frame 62 is fully enclosed and preferably covered in camouflage. Door 64 allows the device to be opened and closed so that a handicapped person may enter or exit the device when frame 62 has been lowered to ground level. Optionally, lock 65 holds the door 64 firmly in place. Window 66 on the right side of the device is shown. There are also windows on the left side, front and back not shown in this figure. These windows preferably have removable, camouflage screens, but this is not necessary. The device is still powered by a motor 74 attached to rear wheel 72 by drive chain or belt 76. The frame 62 also has a roof 68 that is also preferably camouflaged. In this particular embodiment, roof 68 is somewhat elevated in the center and slopes downward towards its edges. However, those skilled in the art will appreciate that any suitable roof design performs that same functions of protecting the operator from the elements and concealing his or her presence. Those skilled in the art will also appreciate that this particular embodiment shows a parallelepiped shaped hunting blind as the frame 62 of the device. It may also be desirable to have a cylindrical or other shaped hunting blind to serve as the frame for the device.

Those skilled in the art will appreciate the addition of a trailer 60 that has side ramp 61 that corresponds to the door on the vehicle itself. In tandem, the trailer ramp 61 and door ramp would allow a person situated in a wheelchair to gain access from the ground 59 to the vehicle located on the trailer 60 for transportation. The axles of the trailer may also retract similar in operation to the device. The trailer also may pivot with respect to the trailer hitch by means of a hydraulic cylinder.

An alternative embodiment of the present invention, not shown, involves vertical rails to guide the raising and lowering of the frame. The main difference between this embodiment and that of FIGS. 1 and 2 is that this device uses vertical guide rails in lieu of pivot arms 22 and 34 in the raising and lowering of the frame. The frame is still raised and lowered from the ground 44 by means of the pistons 30 and 38 which raise and lower the positions of the wheels 24 and 36 respectively. The wheels are connected using an axle that is positioned between two vertical rails. The vertical rails are attached to the body of the frame to act as a guide or slide for the axle connecting the wheels. When the pistons are extended or retracted, the axles slide up and down the vertical rails causing the invention to transform from its stationary to mobile position.

The motor that powers the invention is preferably a hydraulic motor that allows for easy and simplified control of the backward and forward motion. A hydraulic system may also be used to provide power steering for the steering wheel. Those skilled in the art will appreciate that the steering wheel may be replaced by other steering methods. It is also desirable to incorporate a hydraulic system in the invention in order to power the pistons that allow raising and lowering of the frame. However, both hydraulic and pneumatic devices may be incorporated to actuate various features of the invention. Those skilled in the art will appreciate that there is a variety of means and methods for powering the backward and forward motion of the invention, the turning of the front wheels and the raising and lowering of the vehicle.

Figure 4:
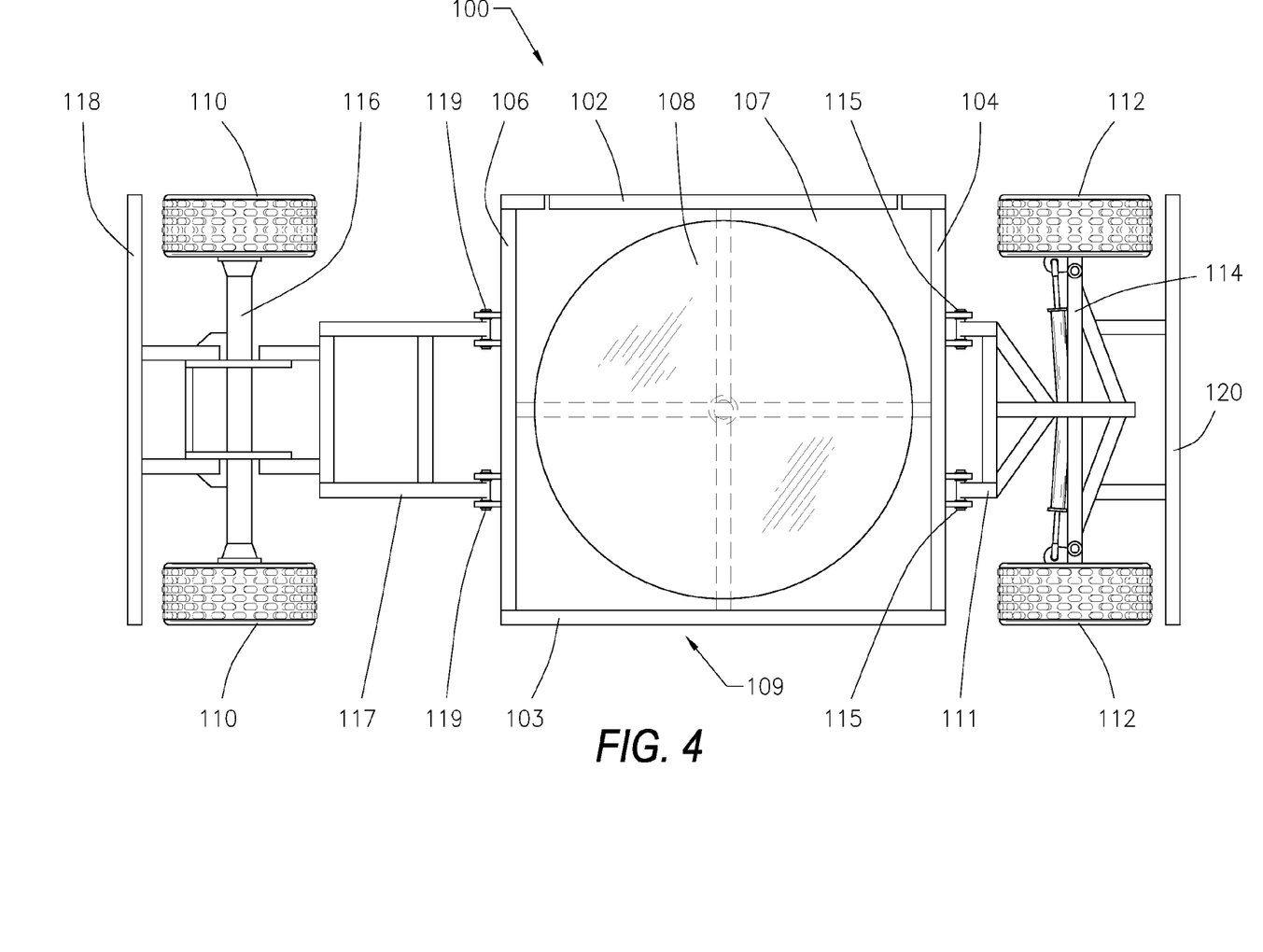
FIG. 4 is a top plan diagrammatic view of the frame of an alternative embodiment of the invention.

FIG. 4 shows a top view of another embodiment of the present invention. Device 100 has a frame 109 comprised of a left plate 102, a right plate 103, a front plate 104 and a back plate 106. Attached to back plate 106 is motor frame 117 that is pivotally attached to back plate 106 a pivot points 119. Frame 117 is attached to axis 116 about which rear wheels 110 rotate. This embodiment also comprises a rear bumper 118. While this figure shows only the frame of the device 100, those skilled in the art will readily recognize that a motor may be mounted on motor frame 117 and a drive chain or belt may be attached to axle 116.

Front plate 104 is attached to front frame 111 that is pivotally attached to front plate 104 by means of pivot points 115. Front frame 111 is also attached to axle 114 about which front wheels 112 rotate. Also included is a front bumper 120. Frame 109 also comprises base 107 about which turntable 108 rotates. Pistons or similar devices rotate front frame 111 and motor frame 117 so as to raise and lower wheels 112 and 110 respectively.

Figure 5:
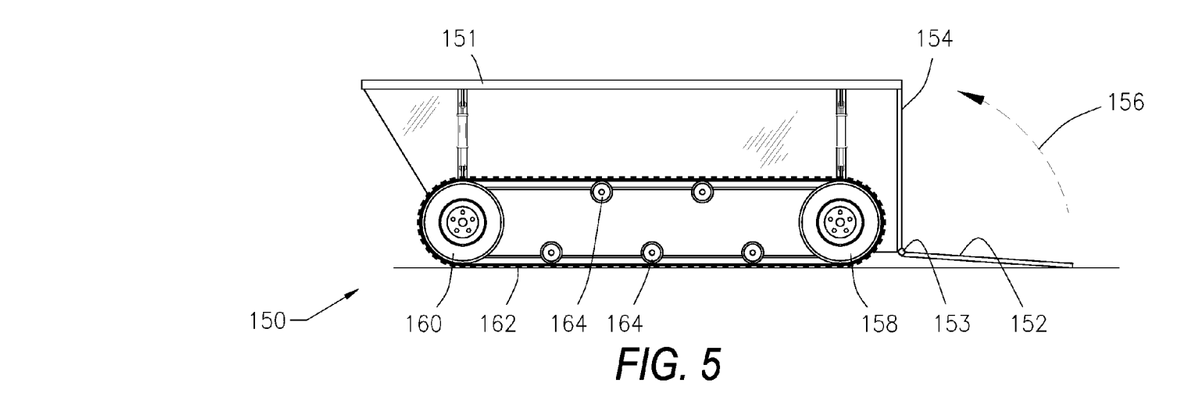
FIG. 5 shows a side view of an alternative embodiment of the present invention.
Figure 6:
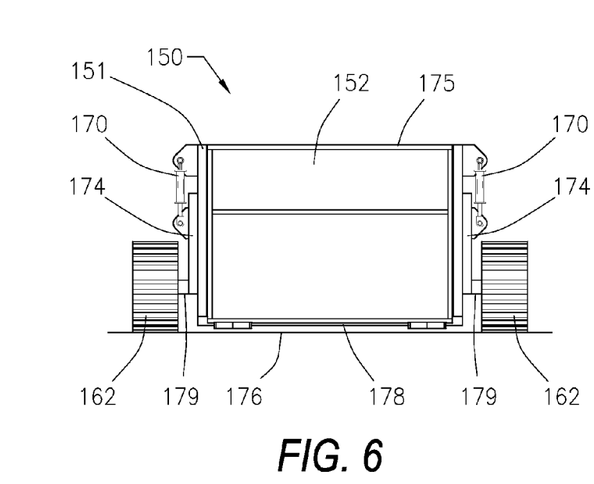
FIG. 6 shows a rear view of an alternative embodiment of the present invention in a stationary position.
Figure 7:
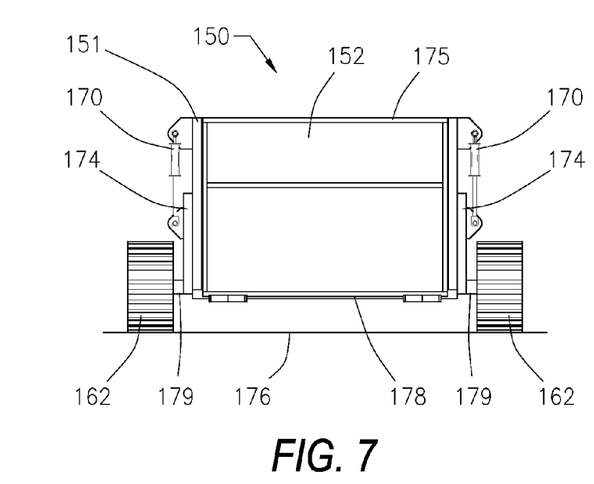
FIG. 7 shows a rear view of an alternative embodiment of the present invention in a raised position.

Those skilled in the art will appreciate that additional features may be added to the present invention. Storage compartments, time and temperature instruments, radio and other communication devices, climate control and sundry, other devices may be incorporated into the present invention. FIGS. 5 through 7 show an alternative embodiment of the present invention. Both this and the previous embodiment as shown all allow for off road transportation and provide a folding down access door. The embodiment shown in FIGS. 5 through 7 illustrate other methods of accomplishing these features.

FIG. 5 shows device 150 comprising a body 151. Body 151 has a back 154 from which ramp 152 pivots along pivot point 153. Door 152 may be pivoted in the direction of arrow 156 to close the body 151 of device 150. Caterpillar tracks 162 are powered by wheel 158, wheel 160 or both. Rollers 164 allow tracks 162 to maintain adequate traction with the ground and tension about wheels 158 and 160. Those skilled in the art will appreciate that in some environments it may be preferable to use Caterpillar tracks rather than wheels. These Caterpillar tracks require that the loading ramp 152 be located in either the rear or the front of the frame. Although in this embodiment the ramp is located in the rear, those skilled in the art will appreciate that it may also be placed in the front. However, it is preferable to place the ramp in the rear so that the steering means and other control devices may be permanently attached to the inside of the front of the frame.

FIG. 6 shows a rearview of device 150 with ramp 152 in the up position. In this figure, the base 178 of frame 151 is flush with the ground 176. Support arms 174 are attached to wheel axles 179 and to lift pistons 170. Lift pistons 170 are attached to the top 175 of frame 151. In FIG. 6, the lift pistons are in the retracted position such that the base 178 is flush with the ground 176.

FIG. 7 shows device 150 in the mobile position, and which the frame 151 is raised above the ground 176. Pistons 170 have been extended to lift the base 178 a sufficient distance above the ground 176.

While this invention has been described to illustrative embodiments, this description is not be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A wheelchair-accessible mobile hunting blind device for transporting a handicapped person situated in a wheelchair across a traveling surface to an off-road location, said device comprising:

a frame including a substantially upright front plate, a substantially upright rear plate, and a substantially horizontal, wheelchair-accessible base intermediate of and substantially perpendicular to said front plate and said rear plate, said wheelchair-accessible base being of adequate size to accommodate said handicapped person situated in said wheelchair;

a front lift assembly pivotally attached to said front plate of said frame, wherein said front lift assembly includes at least one front pivot arm, at least one front actuator, and at least one wheel, wherein said at least one wheel is in contact with said traveling surface, wherein a first terminal end of said front pivot arm is pivotally attached to said front plate of said frame and a second terminal end of said front pivot arm is rotatably attached to said wheel, and wherein said front actuator is pivotally attached at opposing ends to said front pivot arm and said front plate of said frame respectively;

is a rear lift assembly pivotally attached to said rear plate of said frame, wherein said rear lift assembly includes at least one rear pivot arm, at least one rear actuator and at least one wheel, wherein said at least one wheel is in contact with said traveling surface, wherein a first terminal end of said rear pivot arm is pivotally attached to said rear plate of said frame and a second terminal end of said rear pivot arm is rotatably attached to said wheel, and wherein said rear actuator is pivotally attached at opposing ends to said rear pivot arm and said rear plate of said frame respectively;

a motor connected to said wheels for propulsion of said frame, said front lift assembly, and said rear lift assembly across said traveling surface by rotating said wheels;

a mechanism for directional steering situated such that said handicapped person may operate said mechanism for direction steering while situated on said wheelchair-accessible base; and wherein said front lift assembly and said rear lift assembly operate in cooperation to selectively position said device between a lowered, stationary position where said wheelchair-accessible base of said frame is substantially flush with the ground allowing for ingress and egress of said handicapped person situated in said wheelchair and a raised, mobile position where said wheelchair-accessible base of said frame is elevated a distance from the ground and supported by said front lift assembly and said rear lift assembly allowing for transportation of said handicapped person situated in said wheelchair to said off-road location.

2. The device of claim 1 wherein said device includes a door hingedly attached to said wheelchair-accessible base of said frame intermediate of said front plate and said rear plate of said frame, said door being movable between a closed position and an open position; and wherein said door in said open position acts as a ramp for ingress and egress of said handicapped person situated in said wheelchair into said device.

3. The device of claim 1 further comprising a substantially annular turntable rotatably attached to said wheelchair-accessible base; wherein said turntable is of adequate size to accommodate said wheelchair.

4. The device of claim 3 wherein said turntable is substantially parallel to said wheelchair-accessible base and is rotatable about an axis perpendicular to said wheelchair-accessible base allowing said handicapped person situated in said wheelchair to rotate 360 degrees.

5. The device of claim 1 wherein at least said frame is covered in camouflage.

6. The device of claim 1 wherein said frame further comprises a hunting blind comprising a roof and at least one window.

7. The device of claim 1 wherein said mechanism for directional steering is a steering wheel for controlling starboard and port direction steering and a control panel for controlling fore and aft directional steering of said device or a joystick control for controlling fore, aft, starboard and port direction steering of said device.

8. The device of claim 1 wherein said rear lift assembly further comprises a rear deck attached to said rear plate of said frame, wherein said rear deck is supported by a support beam, and wherein said support beam is substantially parallel to said rear plate and substantially perpendicular to said wheelchair-accessible base of said frame.

9. The device of claim 8 wherein said rear deck includes a lifting mechanism allowing said handicapped person situated in said wheelchair to lift prey or other objects onto said rear deck for transport.

10. The device of claim 9 wherein said lifting mechanism is a crane lift arm with winch.

11. The device of claim 1 wherein said wheels of said front lift assembly and said rear lift assembly are Caterpillar tracks.

12. The device of claim 1 wherein said motor is mounted on said rear lift assembly.

13. A wheelchair-accessible mobile hunting blind device for transporting a handicapped person situated in a wheelchair across a traveling surface to an off-road location, said device comprising:
   a frame including a substantially upright front plate, a substantially upright rear plate, and a substantially horizontal, wheelchair-accessible base intermediate of and substantially perpendicular to said front plate and said rear plate, said wheelchair-accessible base being of adequate size to accommodate said handicapped person situated in said wheelchair;
   a front lift assembly pivotally attached to said front plate of said frame, wherein said front lift assembly includes at least one front pivot arm, at least one front actuator, and at least one wheel, wherein said at least one wheel is in contact with said traveling surface, wherein a first terminal end of said front pivot arm is pivotally attached to said front plate of said frame and a second terminal end of said front pivot arm is rotatably attached to said wheel, and wherein said front actuator is pivotally attached at opposing ends to said front pivot arm and said front plate of said frame respectively;
   a rear lift assembly pivotally attached to said rear plate of said frame, wherein said rear lift assembly includes at least one rear pivot arm, at least one rear actuator and at least one wheel, wherein said at least one wheel is in contact with said traveling surface, wherein a first terminal end of said rear pivot arm is pivotally attached to said rear plate of said frame and a second terminal end of said rear pivot arm is rotatably attached to said wheel, and wherein said rear actuator is pivotally attached at opposing ends to said rear pivot arm and said rear plate of said frame respectively;
   a door hingedly attached to said wheelchair-accessible base of said frame intermediate of said front plate and said rear plate of said frame, said door being movable between a closed position and an open position; and wherein said door in said open position acts as a ramp for ingress and egress of said handicapped person situated in said wheelchair into said device;
   a substantially annular turntable rotatably attached to said wheelchair-accessible base and being of adequate size to accommodate said wheelchair, said turntable substantially parallel to said wheelchair-accessible base and rotatable about an axis perpendicular to said wheelchair-accessible base allowing said handicapped person situated in said wheelchair to rotate 360 degrees;
   a motor connected to said wheels for propulsion of said frame, said front lift assembly, and said rear lift assembly across said traveling surface by rotating said wheels;
   a mechanism for directional steering situated such that said handicapped person may operate said mechanism for direction steering while situated on said wheelchair-accessible base; and
   wherein said front lift assembly and said rear lift assembly operate in cooperation to selectively position said device between a lowered, stationary position where said wheelchair-accessible base of said frame is substantially flush with the ground allowing for ingress and egress of said handicapped person situated in said wheelchair and a raised, mobile position where said wheelchair-accessible base of said frame is elevated a distance from the ground and supported by said front lift assembly and said rear lift assembly allowing for transportation of said handicapped person situated in said wheelchair to said off-road location.

14. The device of claim 13 wherein at least said frame is covered in camouflage, and wherein said frame is a hunting blind comprising a roof and at least one window.

15. The device of claim 13 wherein said mechanism for directional steering is a steering wheel for controlling starboard and port direction steering and a control panel for controlling fore and aft directional steering of said device or a joystick control for controlling fore, aft, starboard and port direction steering of said device.

16. The device of claim 13 wherein said rear assembly further comprises a rear deck attached to said rear plate of said frame, wherein said rear deck is supported by a support beam, and wherein said support beam is substantially parallel to said rear plate and substantially perpendicular to said wheelchair-accessible base of said frame.

17. The device of claim 16 wherein said rear deck includes a lifting mechanism allowing said handicapped person situated in said wheelchair to lift prey or other objects onto said rear deck for transport.

* * * * *